United States Patent
Porzio et al.

(10) Patent No.: US 12,260,114 B2
(45) Date of Patent: Mar. 25, 2025

(54) TECHNIQUES FOR PRIORITY INFORMATION

(71) Applicant: Micron Technology, Inc., Boise, ID (US)

(72) Inventors: Luca Porzio, Casalnuovo (IT); Gianluca Coppola, Liveri (IT); Ryan Laity, Boise, ID (US); Christopher Joseph Bueb, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 154 days.

(21) Appl. No.: 17/888,982

(22) Filed: Aug. 16, 2022

(65) Prior Publication Data

US 2024/0061605 A1    Feb. 22, 2024

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ..... G06F 3/0655; G06F 3/0604; G06F 3/0679
See application file for complete search history.

(56) References Cited

U.S. PATENT DOCUMENTS

| | | | |
|---|---|---|---|
| 5,860,121 A * | 1/1999 | Kapp | G11C 11/005 714/6.1 |
| 6,546,504 B1 * | 4/2003 | Gabryjelski | G11B 20/18 |
| 2006/0212651 A1 * | 9/2006 | Ashmore | G06F 11/1441 711/E12.019 |
| 2013/0117493 A1 * | 5/2013 | Skalsky | G06F 12/0646 711/E12.081 |
| 2016/0132256 A1 * | 5/2016 | Jung | G06F 12/0246 711/103 |
| 2020/0380130 A1 * | 12/2020 | Purushotham | G06F 21/566 |
| 2021/0004282 A1 * | 1/2021 | Kim | G06F 11/076 |
| 2021/0397363 A1 * | 12/2021 | Boehm | G06F 11/3409 |
| 2022/0100427 A1 * | 3/2022 | Boehm | G06F 3/0688 |
| 2022/0318392 A1 * | 10/2022 | Albesa | G06F 21/575 |
| 2024/0004760 A1 * | 1/2024 | Amato | G06F 11/1076 |
| 2024/0160386 A1 * | 5/2024 | Bueb | G11C 7/04 |

\* cited by examiner

*Primary Examiner* — Sean D Rossiter
(74) *Attorney, Agent, or Firm* — Holland & Hart LLP

(57) ABSTRACT

Methods, systems, and devices for techniques for priority information are described. A memory system may be configured to receive, at a memory system, an indication that data is critical to operating the memory system; receive the data that is critical to operating the memory system based at least in part on the indication; select one more parameters to provide a reliability of a storage of the data into a memory device of the memory system based at least in part on receiving the indication and receiving the data; and program the data into the memory device of the memory system using the one or more parameters based at least in part on selecting the one or more parameters.

20 Claims, 8 Drawing Sheets

TECHNIQUES FOR PRIORITY INFORMATION

FIELD OF TECHNOLOGY

The following relates to one or more systems for memory, including techniques for priority information.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
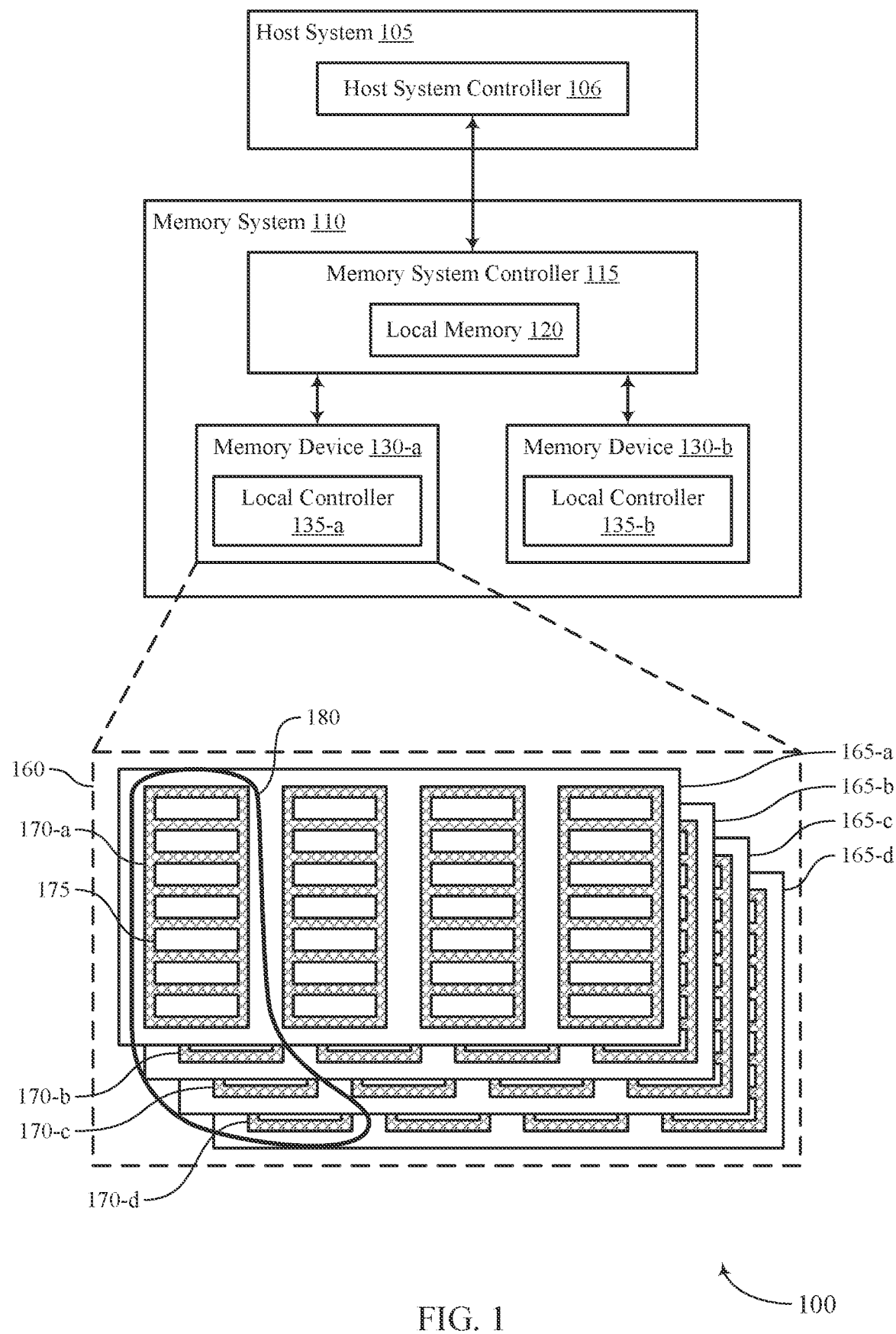
FIG. 1 illustrates an example of a system that supports techniques for priority information in accordance with examples as disclosed herein.

One or more systems for memory, including techniques for priority information, are disclosed. Some memory systems (e.g., solid state drives (SSDs)) are used for non-volatile storage of data on a host system. Mobile computing devices may be dependent upon the use of these memory systems to store operating instructions, applications, and data used to configure the mobile devices in response to being activated. Manufacturers of these mobile systems may program these memory systems with some information before the memory systems are integrated with the mobile devices. As such, the data programmed into these memory systems potentially encounter data errors caused by the final manufacturing steps used to make the mobile devices. For example, some manufacturing steps may expose the memory systems to high heat (e.g., soldering processes), which may introduce errors into the data already stored in the memory system. If these errors occur within data critical to the operation of the mobile devices or within data critical to the operation of the memory system, the errors may render the mobile devices inoperable without a way to correct the errors. Identification and protection of the data that is critical to the operation of the mobile devices and the memory systems may cause failures in the operation of mobile devices experiencing these errors.

Data may be programmed into memory systems (e.g., SSD devices) before the memory systems are used to fabricate computing devices. The memory systems may encounter harsh environmental conditions during fabrication of the computing devices (e.g., during soldering processes). Additionally, information stored in the memory systems may be stored for various duration before the memory systems before they are used regularly. Both of these conditions may give rise to data errors in the data stored into the memory systems. If the data errors occur in portions of memory containing data critical to the operation of the computing devices, the computing devices may be rendered inoperable until a copy of the data is reprogrammed into these memory systems.

Implementations described herein address the aforementioned shortcomings and other shortcomings by providing a mechanism to identify one or more blocks of data programmed into the memory systems that are determined to be critical to the operation of the computing devices in which the memory systems are configured to be installed. The one or more blocks of data may be specified by address ranges and sizes defined within the memory systems. Using the identification of the blocks of memory containing the critical data, the memory systems may store the critical data in locations and using particular storage operations that reduces a likelihood that the data experiences errors. The blocks of critical data within the memory systems are typically a subset of the entire data being programmed into the memory systems. By protecting the data critical to the operation of the computing devices, the computing devices are more likely to successfully initialize, at which time data errors encountered in non-critical data may be addressed and corrected once the computing devices are operating.

Figure 2:
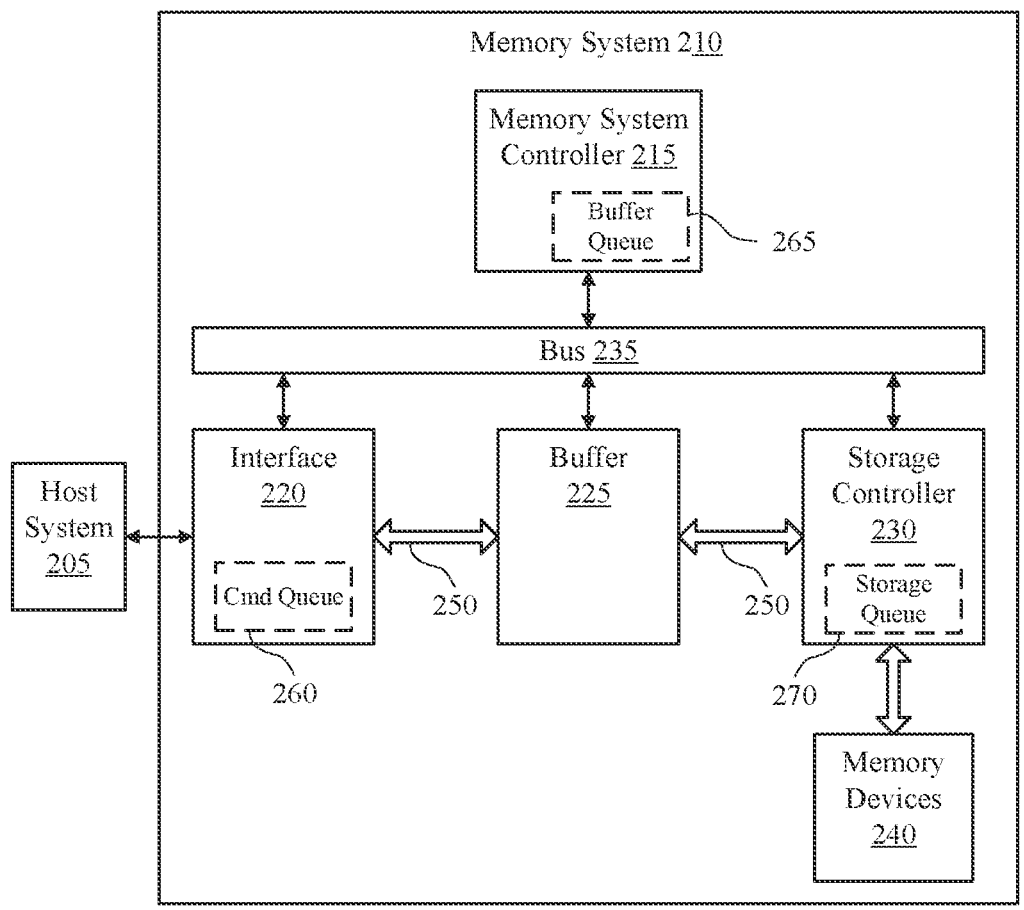
FIG. 2 illustrates an example of a system that supports techniques for priority information in accordance with examples as disclosed herein.

Features of the disclosure are initially described in the context of systems, devices, and circuits with reference to FIGS. 1 through 2. Features of the disclosure are described in the context of identifying and protecting critical data stored within memory devices critical to the operation of devices with reference to FIGS. 3 through 7. These and other features of the disclosure are further illustrated by and described in the context of an apparatus diagram and flowchart that relate to techniques for priority information with reference to FIGS. 8 through 9.

FIG. 1 illustrates an example of a system 100 that supports techniques for priority information in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a vehicle (such as a car, train, drone, airplane, or other conveyance). In some examples, the system 100 may be part of a zonal architecture. In some examples, the system 100 may be an example of a computing device such as a desktop computer, a laptop computer, a network server, a mobile device, an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained, and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support techniques for priority information. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Implementations described herein provide a mechanism to identify one or more blocks of data programmed into the memory systems that are determined to be critical to the operation of the computing devices in which the memory systems are configured to be installed. The one or more blocks of data may be specified by address ranges and sizes defined within the memory systems. Using the identification of the blocks of memory containing the critical data, the memory systems may store the critical data in locations and using particular storage operations that reduces a likelihood that the data experiences errors. The blocks of critical data within the memory systems are typically a subset of the entire data being programmed into the memory systems. By protecting the data critical to the operation of the computing devices, the computing devices are more likely to successfully initialize, at which time data errors encountered in non-critical data may be addressed and corrected once the computing devices are operating.

FIG. 2 illustrates an example of a system 200 that supports techniques for priority information in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, after completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. After receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

After a determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, performing garbage collection). The entries may be added to the storage queue 270, e.g., by the memory system controller 215. The entries may be removed from the storage queue 270 (e.g., by the storage controller 230 or memory system controller 215) after completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, in response to the data transfer to the buffer 225 being completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs, and the memory system controller 215 may identify one or more physical block addresses indicated by the LBAs. In some cases, one or more contiguous LBAs may correspond to non-contiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

Implementations described herein provide a mechanism to identify one or more blocks of data programmed into the memory systems that are determined to be critical to the operation of the computing devices in which the memory systems are configured to be installed. The one or more blocks of data may be specified by address ranges and sizes defined within the memory systems. Using the identification of the blocks of memory containing the critical data, the memory systems may store the critical data in locations and using particular storage operations that reduces a likelihood that the data experiences errors. The blocks of critical data within the memory systems are typically a subset of the entire data being programmed into the memory systems. By protecting the data critical to the operation of the computing devices, the computing devices are more likely to successfully initialize, at which time data errors encountered in non-critical data may be addressed and corrected once the computing devices are operating.

Figure 3:
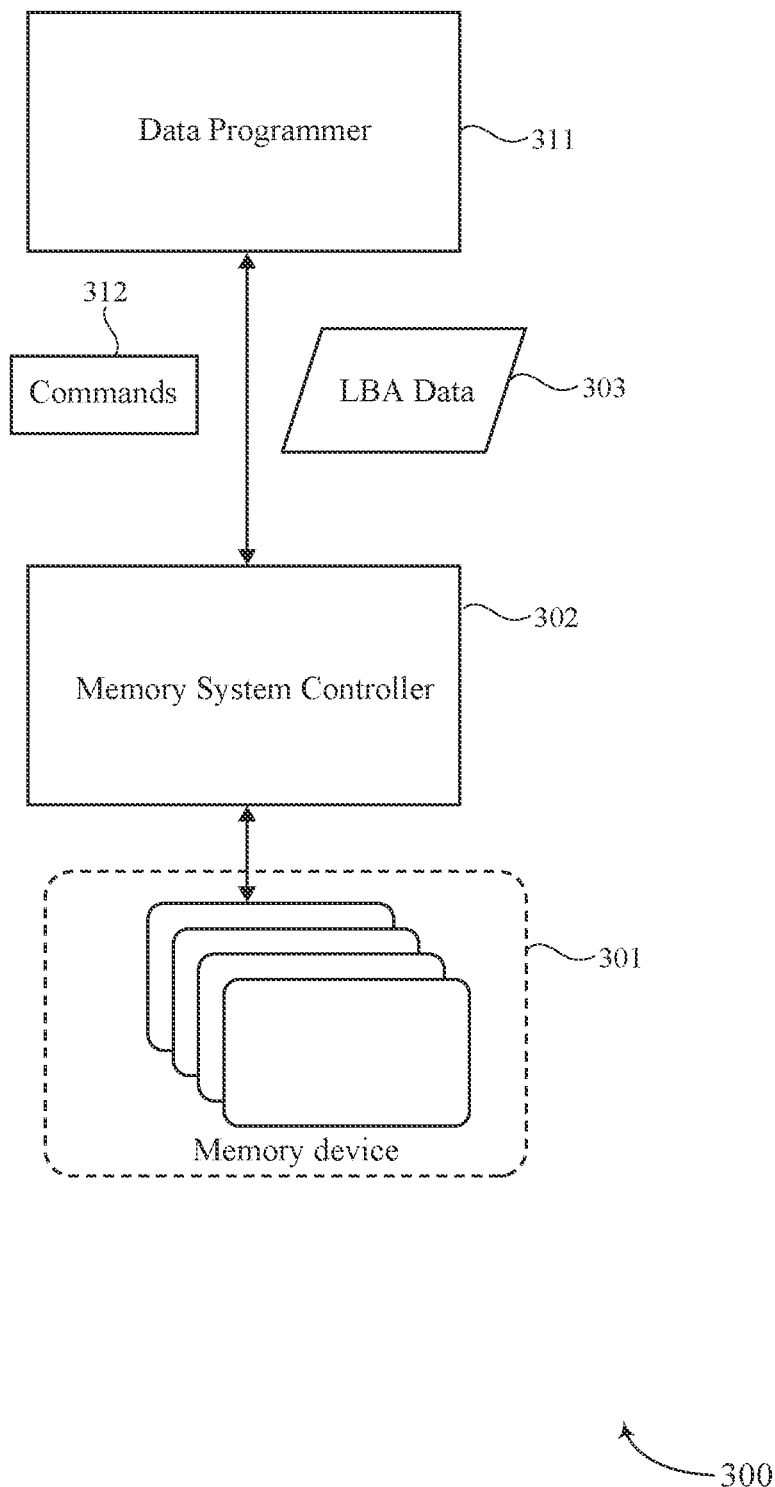
FIG. 3 illustrates an example of a system that supports techniques for priority information in accordance with examples as disclosed herein.

FIG. 3 illustrates an example of a system 300 that supports techniques for priority information in accordance with examples as disclosed herein. In some examples, a memory device 301 is used within devices to store and retrieve data to operate. The memory device 301 is loaded with data by a data programmer 311 prior to being installed within a device during manufacture. The memory device 301 may include data critical to initial operation of the manufactured device that is used during an initial configuration of the manufactured device.

The data programmer 311 communicates with a memory system controller 302 that is part of the memory device 301. These communications include a set of commands 312 to instruct the memory system controller 302 to receive and store data within its memory planes 303a-n. The data is organized into blocks of data addressed by LBAs.

One or more of the blocks of data within all of the LBAs may be considered critical to the operation of the device into which the memory device 301 is to be installed. The data programmer 311 transmits commands 312 to identify which of the LBAs are critical and to be stored within the memory device 301 in a secure manner. Non-critical data, which may contain any other data not considered critical to the initial operation of the device, may be stored by the data programmer 311 into the memory device 301 in a less secure manner. For example, non-critical data may be stored into multiple-level cells based at least in part on overprovisioning while critical data may be stored into single-level cells. Single-level cells are typically less susceptible to data errors during the manufacturing process of the device into which the memory device 301 is to be installed because the read window budget between different states may be bigger in SLC cells than in other types of cells. Multiple-level cells provide higher storage densities for non-critical data. If data errors are found within the non-critical data stored into the multiple-level cells, the device may operate using the critical data to obtain error-free non-critical data from an external source once the device is operational.

After the data is stored, the memory system may be soldered to another part to form a computing system. For example, the memory system may be soldered to a printed circuit board that may be used a variety of applications. In some cases, a processor and other components may also be coupled with the printed circuit board. At first boot up of the memory system after being soldered, the memory system may refresh data stored in the memory system. As soon as possible (e.g., at first system boot up), the may system may attempt to refresh contents in the NAND cells to ensure that the data is stored in more reliable way. Errors may be introduced into the data by the high-temperatures that occur during a soldering process. The memory system may apply different refresh techniques based on whether the data is indicated as critical data (e.g., stored in a critical data area) or the data is indicated as non-critical. For example, critical data (e.g., critical areas in the memory system) may be marked refreshed as soon as possible (e.g., sooner than other non-critical data). In some applications where data reliability requirements may be hard to meet, multiple copies of the critical data may be stored to get a redundant copy for increased reliability. In some examples, if the critical data is stored in areas (e.g., SLC) that may offer good enough protection given the current reliability requirements, then memory system may skip refreshing the critical data and start refreshing other data sooner. Critical data may be examples of data used by the memory system to operate the memory system, such as data that is used to ensure that the memory system operates to designed specifications. Examples of critical data may include trim parameters, voltage thresholds, levels of voltage rails, voltages applied to various components or other data. In some cases, without some or all of the critical data the memory system may not be configured to initialize or operate properly.

Figure 4:
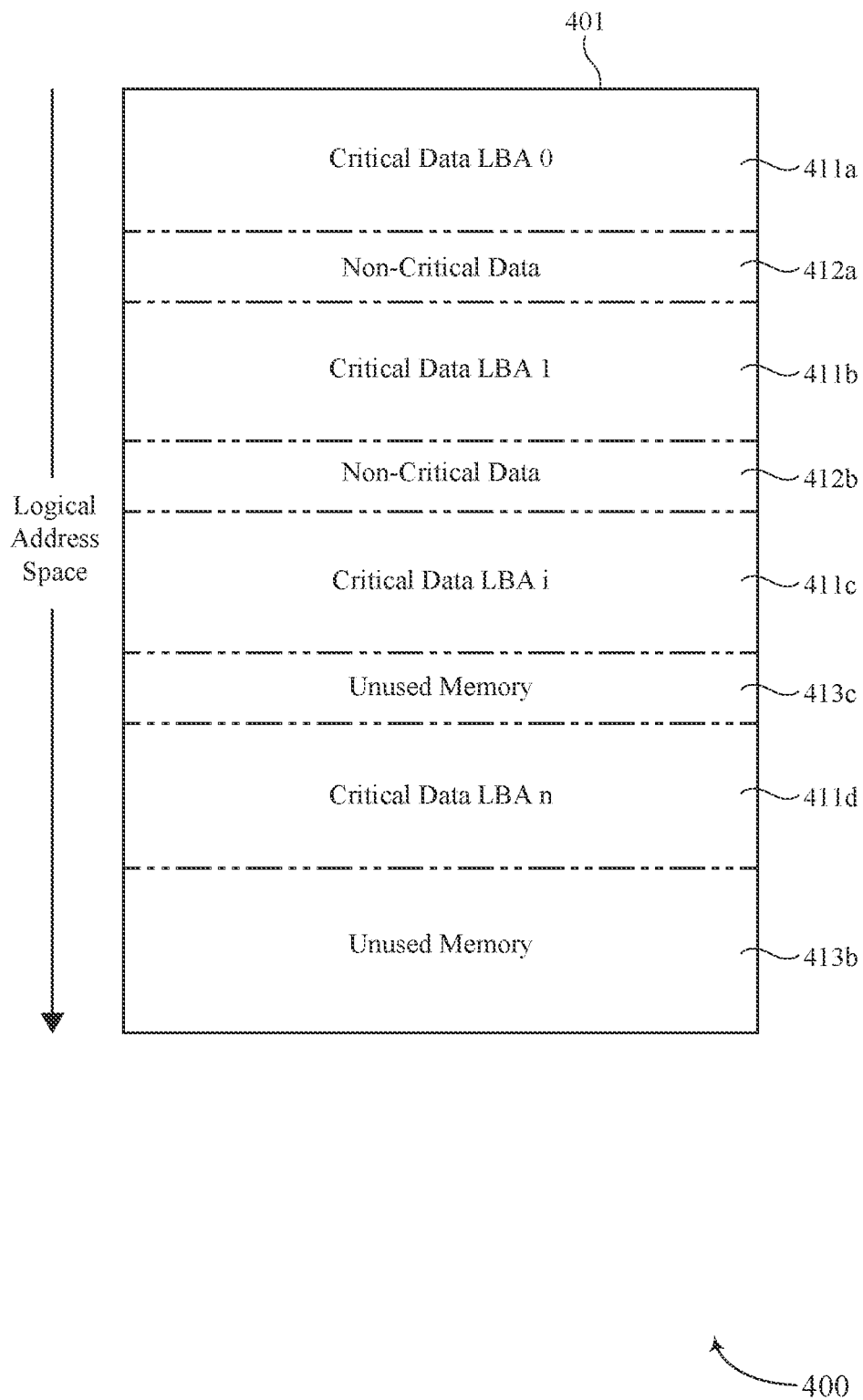
FIG. 4 illustrates an example of a memory map that supports techniques for priority information in accordance with examples as disclosed herein.

FIG. 4 illustrates an example of a memory map 400 that supports techniques for priority information in accordance with examples as disclosed herein. The memory map 400 presents a sequence of blocks of critical data and non-critical data based upon the logical address for a starting address for the block of data and a length of the block or a range of logical addresses within each block of data.

The blocks of data within memory map 400 include blocks of critical data 411a-d, blocks of non-critical data 412a-b, and blocks of memory 413a-b that are not pre-programmed with data. The location and size of these blocks are defined within the commands 312 sent from a data programmer 311 to the memory device 301 in response to the data being programmed into the device.

The blocks of critical data 411a-d may be stored using one or more of the following storage mechanisms: programming the data that is critical to operating the memory system in single level cells based at least in part on overprovisioning, programming redundant copies of the data that is critical to operating the memory system in multiple locations within the memory device, programming the data that is critical to operating the memory system using different parameters (e.g., trim parameters) that result in a slower programming operation, programming the data that is critical to operating the memory system using a different cell level programming setting that results in a more reliable storage of the data and a slower programming operation, programming the data that is critical to operating the memory system using additional parity information, and programming the data that is critical to operating the memory system using error detection and correction encoding.

Figure 5:
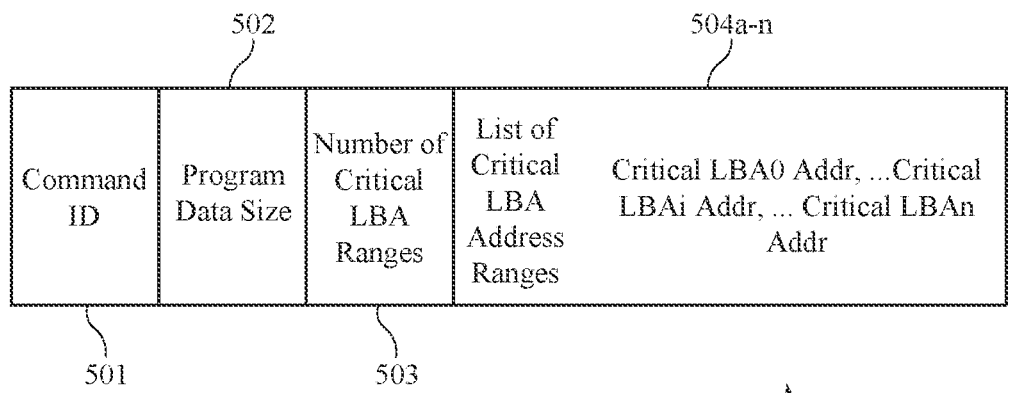
FIG. 5 illustrates an example of a command that supports techniques for priority information in accordance with examples as disclosed herein.

FIG. 5 illustrates an example of a command 500 that supports techniques for priority information in accordance with examples as disclosed herein. If critical blocks of memory 411a-d are identified and communicated to the memory device 301 from the data programmer 311, a first method of specifying the LBAs used to store critical data is shown in FIG. 5. A command 500 (e.g., a CriticalRange-Declare command) may be used to provide the definition of these data blocks to the memory device 301. The command 500 may include a command ID 501, a program data size 502, a number of critical LBA ranges 503, and list of critical list of LBA address ranges.

The command ID 501 may be used to identify the CriticalRangeDeclare command from other commands received by the memory device 301. The program data size 502 contains the total size of all types of data to be programmed into the memory device 301.

The number of critical LBA ranges 503 and list of critical list of LBA address ranges 504a-n provide a list of the addresses corresponding to the critical blocks of data. Each LBA address range 504a-n includes a START-LBA address and a number of memory locations within each LBA. The number of entries in the list of LBA address range 504a-n correspond to the value contained within number of critical LBA ranges 503.

Once the blocks of data critical to the operation of the device are provided to the memory device 301, the data may be stored within the memory device 301 for programming. The memory system controller 302 stores data having logical addresses within one of the identified blocks of critical data, the memory system controller 302 stores the data using a secure manner, as described herein. The memory system controller 302 may store logical address in non-critical blocks of data using other storage mechanism. In some examples, the command 500 may be an example of a vendor-specific command.

Figure 6:
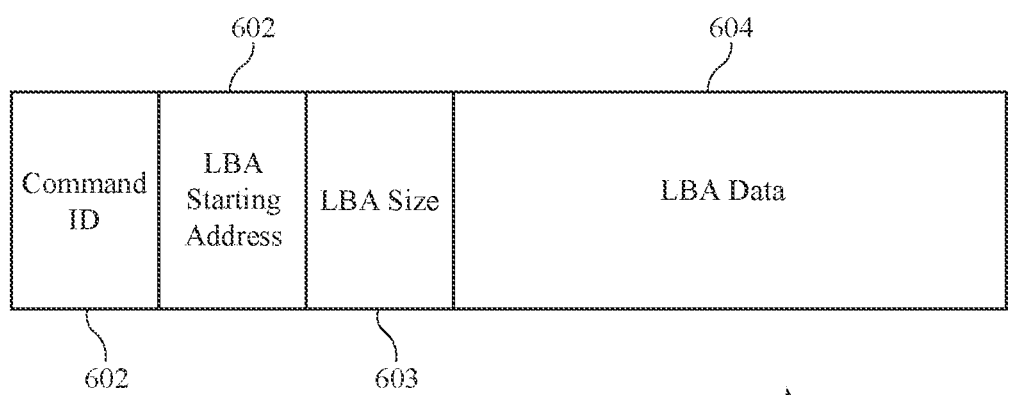
FIG. 6 illustrates an example of a write command that supports techniques for priority information in accordance with examples as disclosed herein.

FIG. 6 illustrates an example of a write command 600 that supports techniques for priority information in accordance with examples as disclosed herein. A second method to communicate the location blocks of critical data is shown in FIG. 6. Data to be programmed into the memory device 301 may be provided using the write command 600. The write command 600 includes a group ID 601, an LBA starting address 602, an LBA size 603, and a block of LBA data 604.

The write command 600 may include a flag that indicates the associated data is to be programmed into the memory device 301 as critical data. For example, the group ID 601 may act as a flag within each block of data to be programmed into the memory device 301 to identify the critical data. A particular group ID 601 may be assigned to identify blocks of critical data. Other group ID values may be considered to be non-critical data in response to programming the memory device 301. The memory device controller 302 may store the blocks of data using these values into identify the critical blocks of data to be stored more securely using one of the more secure storage mechanisms disclosed herein.

Figure 7:
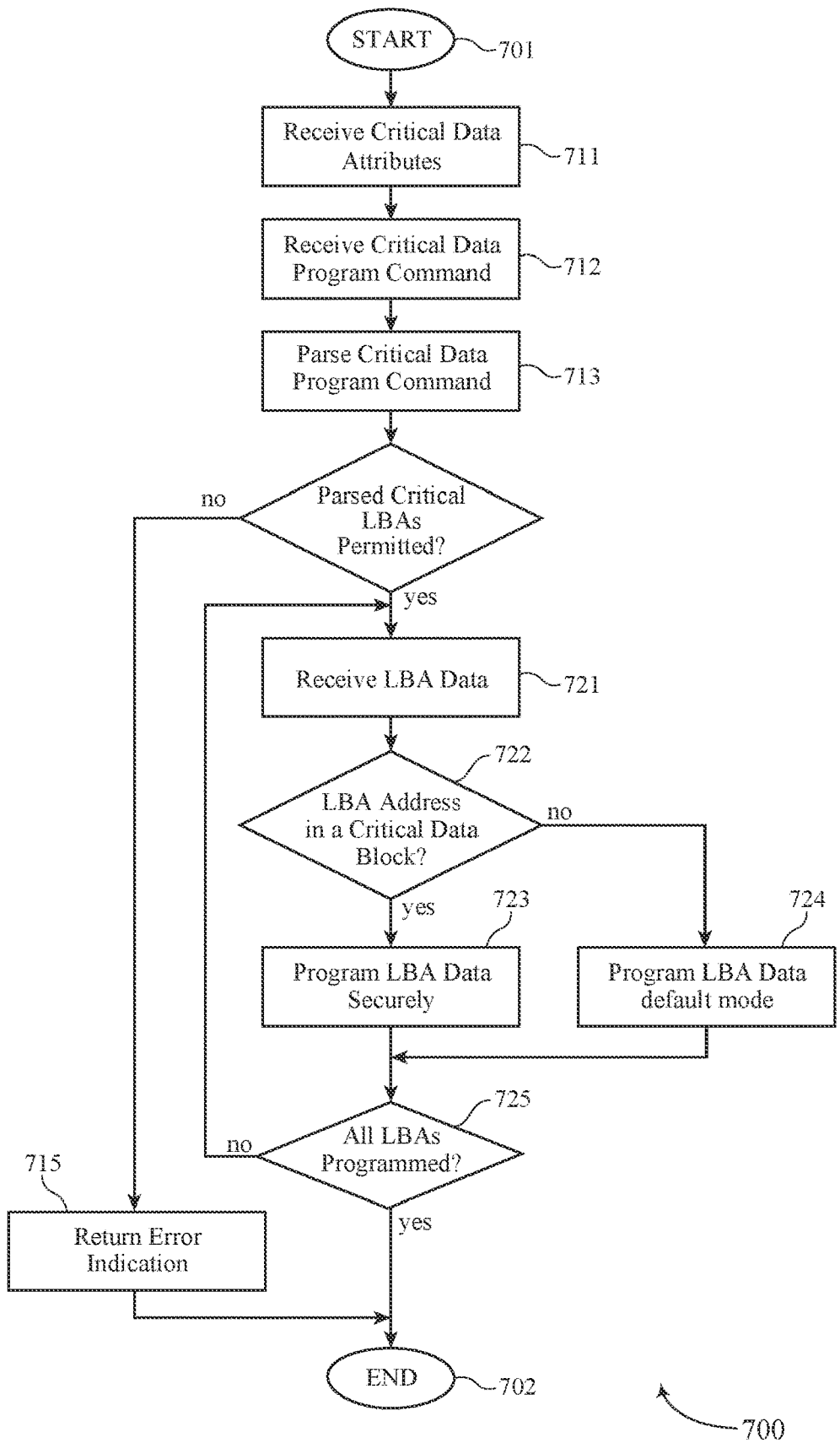
FIG. 7 illustrates an example of a method supports techniques for priority information in accordance with examples as disclosed herein.

FIG. 7 illustrates an example of a method that supports techniques for priority information in accordance with examples as disclosed herein. A process flow 700 may be performed by a memory system as described herein. A process flow 700 begins at 701 after which critical data attributes are received at 711. A critical data program command is received at 712, for example, a CriticalRangeDe-clare command may be used. The memory system parses the critical data program command at 713 to obtain critical data attributes.

At 714, it may be determined whether the parsed critical data attributes are permitted by comparing the parsed critical data attributes to one or more device exposed attributes to determine whether the critical data program command is supported by the memory device. The device may expose attributes to the host system. The attributes may include a bMaxOverallCriticalDataBufferSize attribute, a bMaxCriti-calLBARanges attribute, a bMaxCriticalLBARangeSize attribute, and a bMaxCriticalTotalSize attribute.

The bMaxOverallCriticalDataBufferSize attribute defines a maximum number of LBAs which the memory device 301 can accept as critical. This number is device specific and can be anything from zero (which means feature is not supported) to a maximum device size.

The bMaxCriticalLBARanges attribute defines maximum number of LBARanges supported by the CriticalRangeDe-clare command.

The bMaxCriticalLBARangeSize attribute defines maximum number of each LBA range size supported by the CriticalRangeDeclare command.

The bMaxCriticalTotalSize attribute defines max size of the sum of the Critical LBARangeSizes which a single CriticalRangeDeclare command can accept.

If at 714 it is determined that the parsed critical data attributes are not permitted, an error indication is returned at 715 before the process flow 700 ends 702; otherwise, data is received at 721. At 722 it is determined whether a particular logical address to be used to program a memory location is within a block of critical data, and if so, the LBA data is programmed into the memory device 301 at 723 using a secure mechanism disclosed herein. If at 722 it is determined whether a particular logical address to be used to program a memory location is not within a block of critical data, the LBA data is programmed into the memory device 301 at 724 using a default data mode.

At 725 it is determined whether the blocks of data have been programmed into the memory device 301, and if not, the process flow 700 returns to 721 to receive and program the next block of data to be programmed; otherwise, process flow 700 ends 702.

Figure 8:
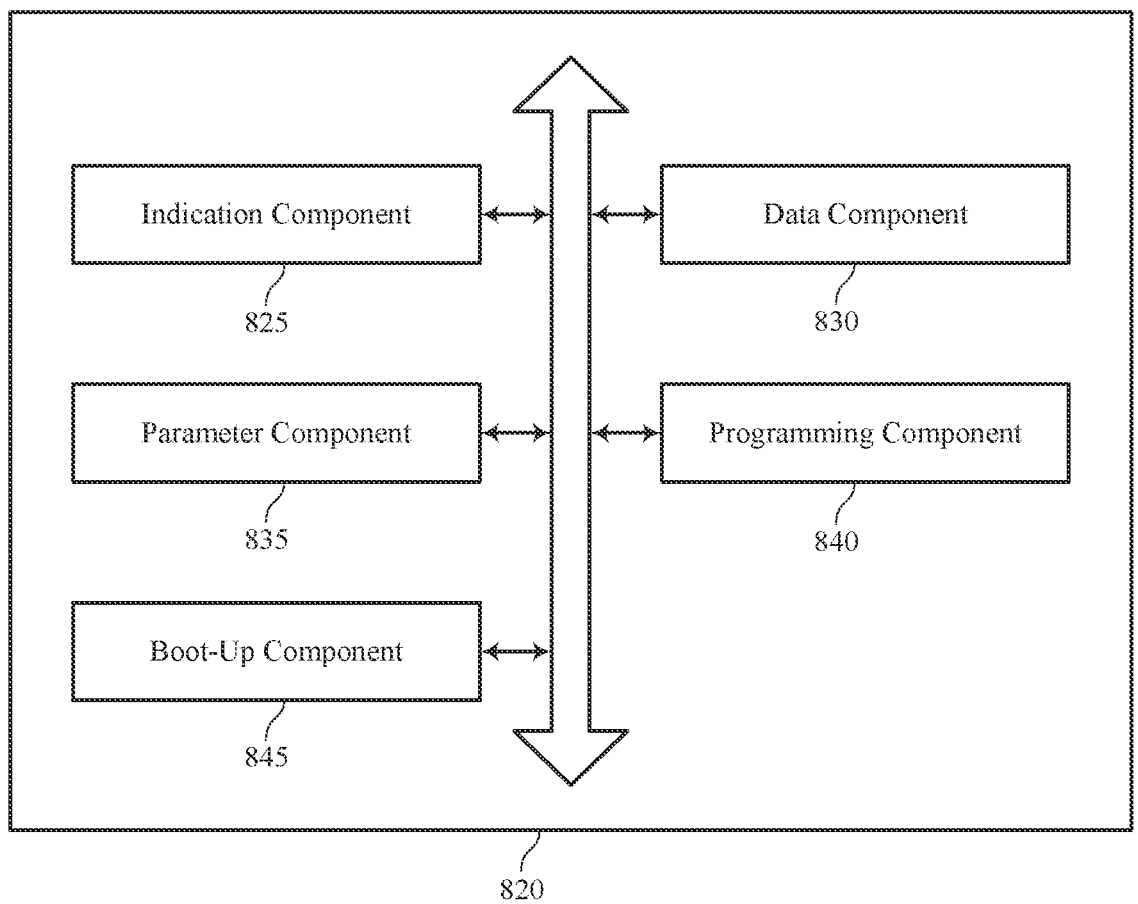
FIG. 8 shows a block diagram of a memory system that supports techniques for priority information in accordance with examples as disclosed herein.

FIG. 8 shows a block diagram 800 of a memory system 820 that supports techniques for priority information in accordance with examples as disclosed herein. The memory system 820 may be an example of aspects of a memory system as described with reference to FIGS. 1 through 7. The memory system 820, or various components thereof, may be an example of means for performing various aspects of techniques for priority information as described herein. For example, the memory system 820 may include an indication component 825, a data component 830, a parameter component 835, a programming component 840, a boot-up component 845, or any combination thereof. Each of these components may communicate, directly or indirectly, with one another (e.g., via one or more buses).

The indication component 825 may be configured as or otherwise support a means for receiving, at a memory system, an indication that data is critical to operating the memory system. The data component 830 may be configured as or otherwise support a means for receiving the data that is critical to operating the memory system based at least in part on the indication. The parameter component 835 may be configured as or otherwise support a means for selecting one more parameters to provide a reliability of a storage of the data into a memory device of the memory system based at least in part on receiving the indication and receiving the data. The programming component 840 may be configured as or otherwise support a means for programming the data into the memory device of the memory system using the one or more parameters based at least in part on selecting the one or more parameters.

In some examples, to support receiving the indication, the indication component 825 may be configured as or otherwise support a means for receiving a command that indicates addresses of the data that is critical to operating the memory system.

In some examples, the indication that the data is critical to operating the memory system is transmitted to the memory system in a range declare command.

In some examples, the command includes a size of the data to be programmed into the memory system, a quantity of address ranges that contain the data that is critical to operating the memory system, and a list of one or more address ranges, an entry of the list includes a starting address and a quantity of addresses for a single address range.

In some examples, to support receiving the indication, the indication component 825 may be configured as or otherwise support a means for receiving a flag concurrently with receiving the data that indicates that the data is critical to operating the memory system.

In some examples, the flag includes a single bit flag within the data being programmed into the memory system.

In some examples, the flag includes an electrical signal asserted to an input of the memory system concurrently with communicating the data critical to operating the memory system.

In some examples, the flag is included in a dedicated group identifier associated with the data.

In some examples, the boot-up component 845 may be configured as or otherwise support a means for initiating a boot-up procedure of the memory system based at least in part on programming the data into the memory device. In some examples, the boot-up component 845 may be configured as or otherwise support a means for refreshing the data critical to operating the memory system in the memory device before refreshing other data in the memory system based at least in part on the data being critical to operating the memory system.

In some examples, to support programming the data, the programming component 840 may be configured as or otherwise support a means for programming the data that is critical to operating the memory system in single level cells based at least in part on overprovisioning. In some examples, to support programming the data, the programming component 840 may be configured as or otherwise support a means for programming redundant copies of the data that is critical to operating the memory system in multiple locations within the memory device. In some examples, to support programming the data, the programming component 840 may be configured as or otherwise support a means for programming the data that is critical to operating the memory system using different parameters that result in a slower programming operation. In some examples, to support programming the data, the programming component 840 may be configured as or otherwise support a means for programming the data that is critical to operating the memory system using a different cell level programming setting that results in a more reliable storage of the data and a slower programming operation. In some examples, to support programming the data, the programming component 840 may be configured as or otherwise support a means for programming the data that is critical to operating the memory system using additional parity information. In some examples, to support programming the data, the programming component 840 may be configured as or otherwise support a means for programming the data that is critical to operating the memory system using error detection and correction encoding.

In some examples, the data that is critical to operating the memory system includes boot data, kernel binary image data, or a minimum set of applications capable to obtain and restore remaining data, or any combination thereof.

In some examples, the indication that the data that is critical to operating the memory system includes a maximum buffer size associated with critical data, a maximum quantity of ranges of addresses associated with the critical, a maximum quantity of addresses in a range associated with the critical data, and a maximum size of memory configured to store the critical data.

In some examples, storing the data that is critical to operating the memory system in single level cells reduces refreshing the data that is critical to operating the memory system before refreshing other data stored within the memory system.

In some examples, the memory device of the memory system is programmed with the data prior to installation of the memory device into a target computing device.

In some examples, the memory device of the memory system is coupled with a printed circuit board.

In some examples, programming the data into the memory device of the memory system using the one or more parameters occurs before soldering the memory system with a different system.

Figure 9:
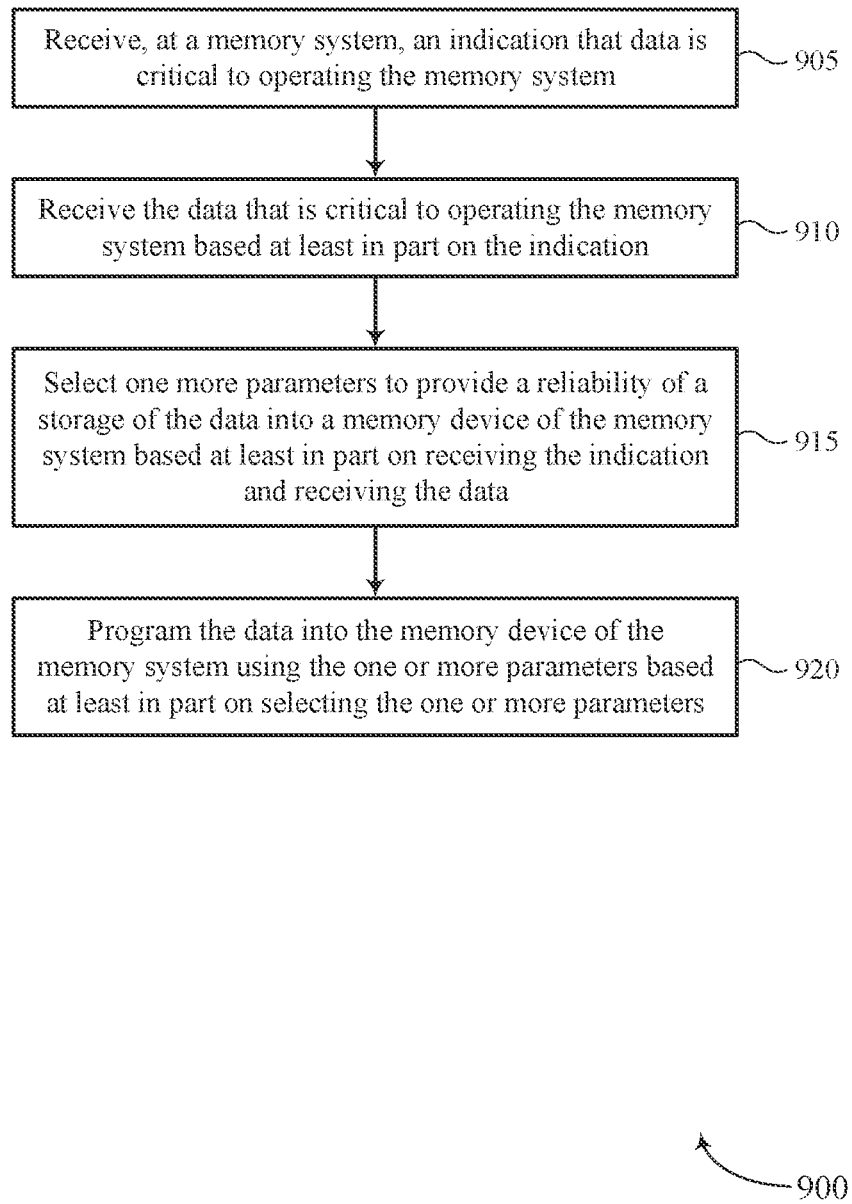
FIG. 9 shows a flowchart illustrating a method or methods that support techniques for priority information in accordance with examples as disclosed herein.

FIG. 9 shows a flowchart illustrating a method 900 that supports techniques for priority information in accordance with examples as disclosed herein. The operations of method 900 may be implemented by a memory system or its components as described herein. For example, the operations of method 900 may be performed by a memory system as described with reference to FIGS. 1 through 8. In some examples, a memory system may execute a set of instructions to control the functional elements of the device to perform the described functions. Additionally, or alternatively, the memory system may perform aspects of the described functions using special-purpose hardware.

At 905, the method may include receiving, at a memory system, an indication that data is critical to operating the memory system. The operations of 905 may be performed in accordance with examples as disclosed herein. In some examples, aspects of the operations of 905 may be performed by an indication component 825 as described with reference to FIG. 8.

At 910, the method may include receiving the data that is critical to operating the memory system based at least in part on the indication. The operations of 910 may be performed in accordance with examples as disclosed herein. In some examples, aspects of the operations of 910 may be performed by a data component 830 as described with reference to FIG. 8.

At 915, the method may include selecting one more parameters to provide a reliability of a storage of the data into a memory device of the memory system based at least in part on receiving the indication and receiving the data. The operations of 915 may be performed in accordance with examples as disclosed herein. In some examples, aspects of the operations of 915 may be performed by a parameter component 835 as described with reference to FIG. 8.

At 920, the method may include programming the data into the memory device of the memory system using the one or more parameters based at least in part on selecting the one or more parameters. The operations of 920 may be performed in accordance with examples as disclosed herein. In some examples, aspects of the operations of 920 may be performed by a programming component 840 as described with reference to FIG. 8.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory system, an indication that data is critical to operating the memory system; receiving the data that is critical to operating the memory system based at least in part on the indication; selecting one more parameters to provide a reliability of a storage of the data into a memory device of the memory system based at least in part on receiving the indication and receiving the data; and programming the data into the memory device of the memory system using the one or more parameters based at least in part on selecting the one or more parameters.

Aspect 2: The method, apparatus, or non-transitory computer-readable medium of aspect 1, where receiving the indication further includes operations, features, circuitry, logic, means, or instructions, or any combination thereof for receiving a command that indicates addresses of the data that is critical to operating the memory system.

Aspect 3: The method, apparatus, or non-transitory computer-readable medium of aspect 2, where the indication that the data is critical to operating the memory system is transmitted to the memory system in a range declare command.

Aspect 4: The method, apparatus, or non-transitory computer-readable medium of any of aspects 2 through 3, where the command includes a size of the data to be programmed into the memory system, a quantity of address ranges that contain the data that is critical to operating the memory system, and a list of one or more address ranges, an entry of the list includes a starting address and a quantity of addresses for a single address range.

Aspect 5: The method, apparatus, or non-transitory computer-readable medium of any of aspects 1 through 4, where receiving the indication further includes operations, features, circuitry, logic, means, or instructions, or any combination thereof for receiving a flag concurrently with receiving the data that indicates that the data is critical to operating the memory system.

Aspect 6: The method, apparatus, or non-transitory computer-readable medium of aspect 5, where the flag includes a single bit flag within the data being programmed into the memory system.

Aspect 7: The method, apparatus, or non-transitory computer-readable medium of any of aspects 5 through 6, where the flag includes an electrical signal asserted to an input of the memory system concurrently with communicating the data critical to operating the memory system.

Aspect 8: The method, apparatus, or non-transitory computer-readable medium of any of aspects 5 through 7, where the flag is included in a dedicated group identifier associated with the data.

Aspect 9: The method, apparatus, or non-transitory computer-readable medium of any of aspects 1 through 8, further including operations, features, circuitry, logic, means, or instructions, or any combination thereof for initiating a boot-up procedure of the memory system based at least in part on programming the data into the memory device and refreshing the data critical to operating the memory system in the memory device before refreshing other data in the memory system based at least in part on the data being critical to operating the memory system.

Aspect 10: The method, apparatus, or non-transitory computer-readable medium of any of aspects 1 through 9, where programming the data further includes operations, features, circuitry, logic, means, or instructions, or any combination thereof for programming the data that is critical to operating the memory system in single level cells based at least in part on overprovisioning; programming redundant copies of the data that is critical to operating the memory system in multiple locations within the memory device; programming the data that is critical to operating the memory system using different parameters that result in a slower programming operation; programming the data that is critical to operating the memory system using additional parity information; and programming the data that is critical to operating the memory system using error detection and correction encoding.

Aspect 11: The method, apparatus, or non-transitory computer-readable medium of any of aspects 1 through 10, where the data that is critical to operating the memory system includes boot data, kernel binary image data, or a minimum set of applications capable to obtain and restore remaining data, or any combination thereof Aspect 12: The method, apparatus, or non-transitory computer-readable medium of any of aspects 1 through 11, where the indication that the data that is critical to operating the memory system includes a maximum buffer size associated with critical data, a maximum quantity of ranges of addresses associated with the critical, a maximum quantity of addresses in a range associated with the critical data, and a maximum size of memory configured to store the critical data.

Aspect 13: The method, apparatus, or non-transitory computer-readable medium of aspect 12, where storing the data that is critical to operating the memory system in single level cells reduces refreshing the data that is critical to operating the memory system before refreshing other data stored within the memory system.

Aspect 14: The method, apparatus, or non-transitory computer-readable medium of any of aspects 1 through 13, where the memory device of the memory system is programmed with the data prior to installation of the memory device into a target computing device.

Aspect 15: The method, apparatus, or non-transitory computer-readable medium of aspect 14, where the memory device of the memory system is coupled with a printed circuit board.

Aspect 16: The method, apparatus, or non-transitory computer-readable medium of any of aspects 1 through 15, where programming the data into the memory device of the memory system using the one or more parameters occurs before soldering the memory system with a different system.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and second condition or action may occur directly as a result of the previous condition or action occurring independent of whether other conditions or actions occur. In some examples, a first condition or action may be performed, and second condition or action may occur directly as a result of the previous condition or action occurring, such that no other intermediate conditions or actions occur between the earlier condition or action and the second condition or action, or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
    one or more memory devices; and
    processing circuitry associated with the one or more memory devices and configured to cause the memory system to:
        receive, at the memory system, an indication that data is critical to operating the memory system, the indication comprising a size of the data that is critical to operating the memory system;
        receive the data that is critical to operating the memory system based at least in part on the indication;
        select one or more parameters to provide a reliability of a storage of the data into the one or more memory devices of the memory system based at least in part on receiving the indication and receiving the data; and
        program the data into the one or more memory devices of the memory system using the one or more parameters based at least in part on selecting the one or more parameters.

2. The memory system of claim 1, wherein receiving the indication is further configured to cause the memory system to:
    receive a command that indicates addresses of the data that is critical to operating the memory system.

3. The memory system of claim 2, wherein the indication that the data is critical to operating the memory system is transmitted to the memory system in a range declare command.

4. A memory system, comprising:
    one or more memory devices; and
    processing circuitry associated with the one or more memory devices and configured to cause the memory system to:
        receive, at the memory system, an indication that data is critical to operating the memory system, wherein receiving the indication comprises receiving a command that indicates addresses of the data that is critical to operating the memory system, wherein the command comprises a size of the data to be programmed into the memory system, a quantity of address ranges that contain the data that is critical to operating the memory system, and a list of one or more address ranges, an entry of the list comprising a starting address and a quantity of addresses for a single address range;
receive the data that is critical to operating the memory system based at least in part on the indication;
select one or more parameters to provide a reliability of a storage of the data into the one or more memory devices of the memory system based at least in part on receiving the indication and receiving the data; and
program the data into the one or more memory devices of the memory system using the one or more parameters based at least in part on selecting the one or more parameters.

5. The memory system of claim 1, wherein receiving the indication is further configured to cause the memory system to:
receive a flag concurrently with receiving the data that indicates that the data is critical to operating the memory system.

6. The memory system of claim 5, wherein the flag comprises a single bit flag within the data being programmed into the memory system.

7. The memory system of claim 5, wherein the flag comprises an electrical signal asserted to an input of the memory system concurrently with communicating the data critical to operating the memory system.

8. The memory system of claim 5, wherein the flag is included in a dedicated group identifier associated with the data.

9. A memory system, comprising:
one or more memory devices; and
processing circuitry associated with the one or more memory devices and configured to cause the memory system to:
receive, at the memory system, an indication that data is critical to operating the memory system;
receive the data that is critical to operating the memory system based at least in part on the indication;
select one or more parameters to provide a reliability of a storage of the data into the one or more memory devices of the memory system based at least in part on receiving the indication and receiving the data;
program the data into the one or more memory devices of the memory system using the one or more parameters based at least in part on selecting the one or more parameters;
initiate a boot-up procedure of the memory system based at least in part on programming the data into the one or more memory devices; and
refresh the data critical to operating the memory system in the one or more memory devices before refreshing other data in the memory system based at least in part on the data being critical to operating the memory system.

10. The memory system of claim 1, wherein programming the data is further configured to cause the memory system to:
program the data that is critical to operating the memory system in single level cells based at least in part on overprovisioning;
program redundant copies of the data that be critical to operating the memory system in multiple locations within the one or more memory devices;
program the data that is critical to operating the memory system using a different cell level programming setting that results in a more reliable storage of the data and a slower programming operation; and program the data that is critical to operating the memory system using additional parity information; or program the data that is critical to operating the memory system using error detection and correction encoding.

11. The memory system of claim 1, wherein the data that is critical to operating the memory system comprises boot data, kernel binary image data, or a minimum set of applications capable to obtain and restore remaining data, or any combination thereof.

12. A memory system, comprising:
one or more memory devices; and
processing circuitry associated with the one or more memory devices and configured to cause the memory system to:
receive, at the memory system, an indication that data is critical to operating the memory system, the indication that the data is critical to operating the memory system comprising a maximum buffer size associated with critical data, a maximum quantity of ranges of addresses associated with the critical data, a maximum quantity of addresses in a range associated with the critical data, and a maximum size of memory configured to store the critical data;
receive the data that is critical to operating the memory system based at least in part on the indication;
select one or more parameters to provide a reliability of a storage of the data into the one or more memory devices of the memory system based at least in part on receiving the indication and receiving the data; and
program the data into the one or more memory devices of the memory system using the one or more parameters based at least in part on selecting the one or more parameters.

13. The memory system of claim 12, wherein storing the data that is critical to operating the memory system in single level cells reduces refreshing the data that is critical to operating the memory system before refreshing other data stored within the memory system.

14. The memory system of claim 1, wherein the one or more memory devices of the memory system is programmed with the data prior to installation of the one or more memory devices into a target computing device.

15. The memory system of claim 14, wherein the one or more memory devices of the memory system is coupled with a printed circuit board.

16. The memory system of claim 1, wherein programming the data into the one or more memory devices of the memory system using the one or more parameters occurs before soldering the memory system with a different system.

17. A non-transitory computer-readable medium storing code, the code comprising instructions executable by processing circuitry to:
receive, at a memory system, an indication that data is critical to operating the memory system, the indication comprising a size of the data that is critical to operating the memory system;
receive the data that is critical to operating the memory system based at least in part on the indication;
select one or more parameters to provide a reliability of a storage of the data into a memory device of the memory system based at least in part on receiving the indication and receiving the data; and
program the data into the memory device of the memory system using the one or more parameters based at least in part on selecting the one or more parameters.

18. The non-transitory computer-readable medium of claim 17, wherein the instructions to receive the indication are further executable by the processing circuitry to:
receive a command that indicates addresses of the data that is critical to operating the memory system.

19. A method, comprising:
receiving, at a memory system, an indication that data is critical to operating the memory system, the indication comprising a size of the data that is critical to operating the memory system;
receiving the data that is critical to operating the memory system based at least in part on the indication;
selecting one or more parameters to provide a reliability of a storage of the data into a memory device of the memory system based at least in part on receiving the indication and receiving the data; and
programming the data into the memory device of the memory system using the one or more parameters based at least in part on selecting the one or more parameters.

20. The method of claim 19, wherein receiving the indication further comprises:
receiving a command that indicates addresses of the data that is critical to operating the memory system.

* * * * *